United States Patent
Sekine

(10) Patent No.: US 12,518,757 B2
(45) Date of Patent: Jan. 6, 2026

(54) EXPLANATION SUPPORT SYSTEM

(71) Applicant: Interactive Solutions Corp., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 18/575,337

(22) PCT Filed: Jun. 3, 2022

(86) PCT No.: PCT/JP2022/022627
§ 371 (c)(1),
(2) Date: Dec. 29, 2023

(87) PCT Pub. No.: WO2023/013226
PCT Pub. Date: Feb. 9, 2023

(65) Prior Publication Data
US 2024/0331692 A1  Oct. 3, 2024

(30) Foreign Application Priority Data
Aug. 2, 2021  (JP) ................................ 2021-126987

(51) Int. Cl.
*G10L 15/22*  (2006.01)
*G06F 3/0488*  (2022.01)

(52) U.S. Cl.
CPC ............ *G10L 15/22* (2013.01); *G06F 3/0488* (2013.01); *G10L 2015/228* (2013.01)

(58) Field of Classification Search
None
See application file for complete search history.

(56) References Cited

U.S. PATENT DOCUMENTS 10,805,465 B1 * 10/2020 Krebs .................... G06F 40/279
10,902,481 B1 *  1/2021 Kanefsky ............ H04M 3/5166
(Continued)

FOREIGN PATENT DOCUMENTS

CN    109346086 A    2/2019
CN    111902831 A    11/2020
(Continued)

OTHER PUBLICATIONS

International Search Report of International Patent Application No. PCT/JP2022/022627 completed on Aug. 1, 2022 and mailed Aug. 16, 2022 (4 pages).
(Continued)

*Primary Examiner* — Jonathan C Kim
(74) *Attorney, Agent, or Firm* — Pyprus Pte Ltd; George Liu

(57) ABSTRACT

Provided is a system that performs proper display under recognition of vocalizer in conversation. An explanation support system 1 includes a display unit 3, a material storage unit 5 that stores an explanation material and a plurality of keywords related to the explanation material, a display information storage unit 7 that stores display information displayed on the display unit 3 based on a combination of the keywords, a voice analysis unit 9 that analyzes voice terms that are terms included in voice information related to the explanation material and vocalizers of the voice terms, and a display control unit 11 that identifies which of the plurality of keywords the voice term of a specific vocalizer analyzed by the voice analysis unit 9 is, reads out the display information from the display information storage unit 7 using information related to the identified keyword, and causes the display unit 3 to display the display information.

4 Claims, 6 Drawing Sheets

(56) References Cited

U.S. PATENT DOCUMENTS

| | | | | |
|---|---|---|---|---|
| 11,429,834 | B1* | 8/2022 | Xue | .......................... G06N 3/09 |
| 2005/0216269 | A1* | 9/2005 | Scahill | ................ H04M 3/5183 |
| | | | | 704/270.1 |
| 2021/0006660 | A1* | 1/2021 | Adibi | .................... G06F 40/174 |
| 2021/0136207 | A1* | 5/2021 | Adibi | .................... G10L 13/027 |
| 2021/0397311 | A1* | 12/2021 | Soini | ................... H04M 3/5183 |
| 2021/0398523 | A1* | 12/2021 | Sekine | ................. G06F 16/433 |
| 2022/0148578 | A1* | 5/2022 | Sekine | ................. G10L 15/183 |
| 2022/0399011 | A1* | 12/2022 | Sekine | ................... G10L 15/32 |

FOREIGN PATENT DOCUMENTS

| | | |
|---|---|---|
| CN | 111919251 A | 11/2020 |
| JP | 2013-025609 A | 2/2013 |
| JP | 2017-134647 A | 8/2017 |
| JP | 2017-173768 A | 9/2017 |
| JP | WO 2019171645 A1 | 9/2019 |
| JP | 2020-119112 A | 8/2020 |
| JP | 6758732 B | 9/2020 |
| JP | 2021-012700 A | 2/2021 |
| JP | 2021-081452 A | 5/2021 |

OTHER PUBLICATIONS

Written Opinion of International Patent Application No. PCT/JP2022/022627 completed on Aug. 1, 2022 and mailed Aug. 16, 2022 (3 pages).
1st Office Action of Chinese patent application No. 202280004795.6 dated Sep. 27, 2023 (6 pages).
2nd Office Action of Chinese patent application No. 202280004795.6 dated Mar. 13, 2024 (4 pages).

\* cited by examiner

[Fig. 1]
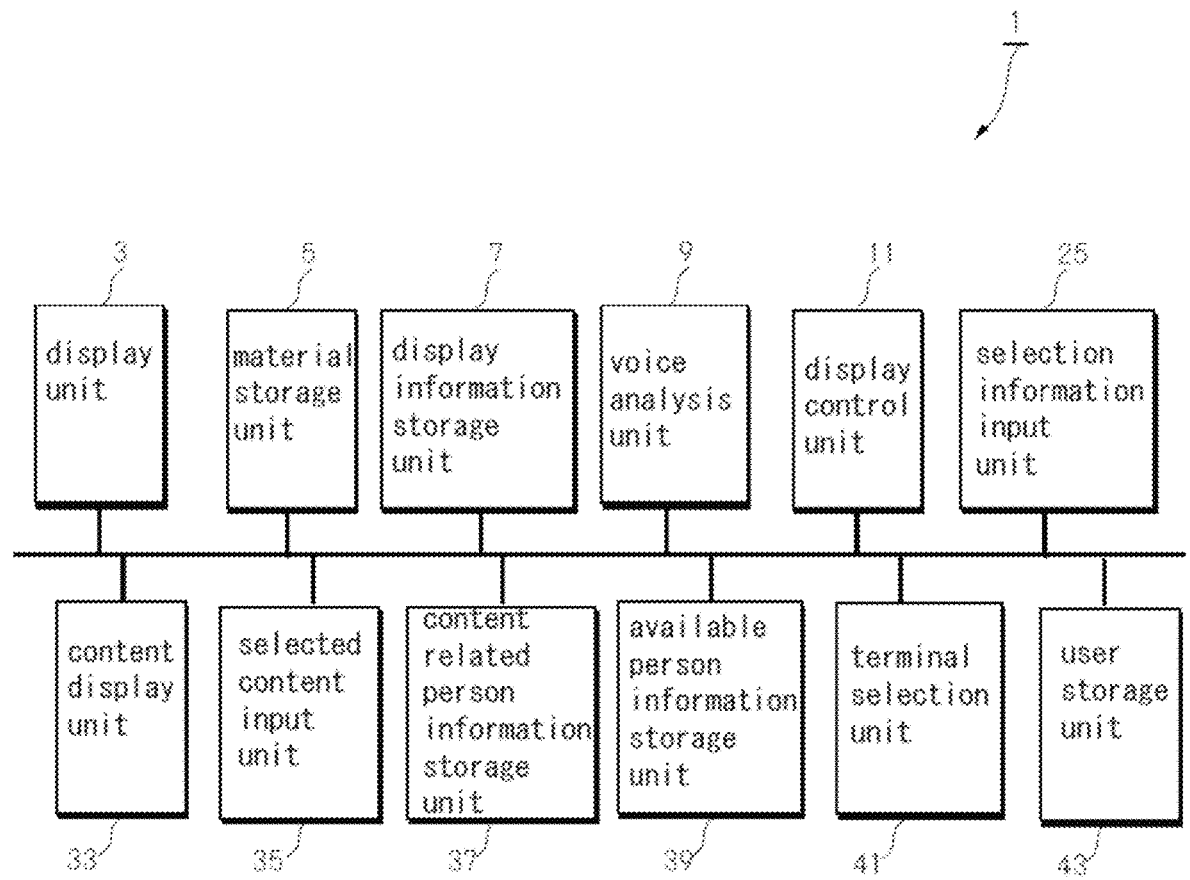
[Fig. 2]
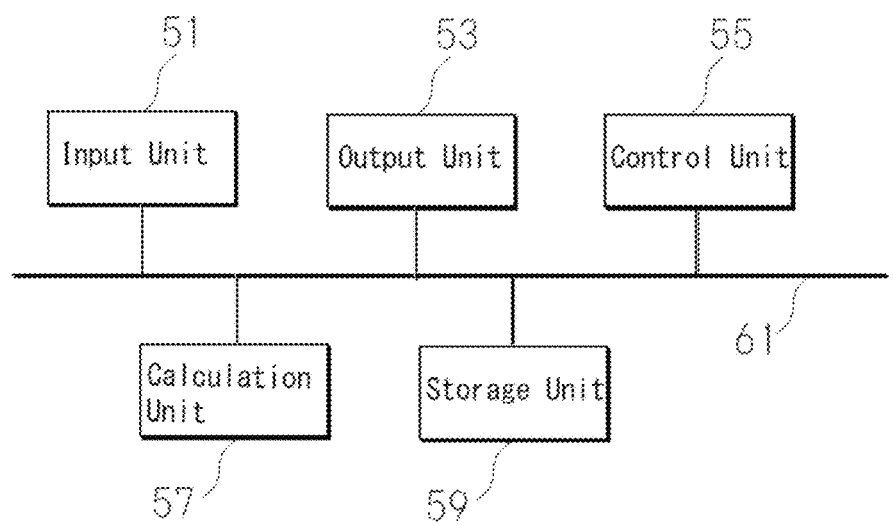

[Fig. 3]
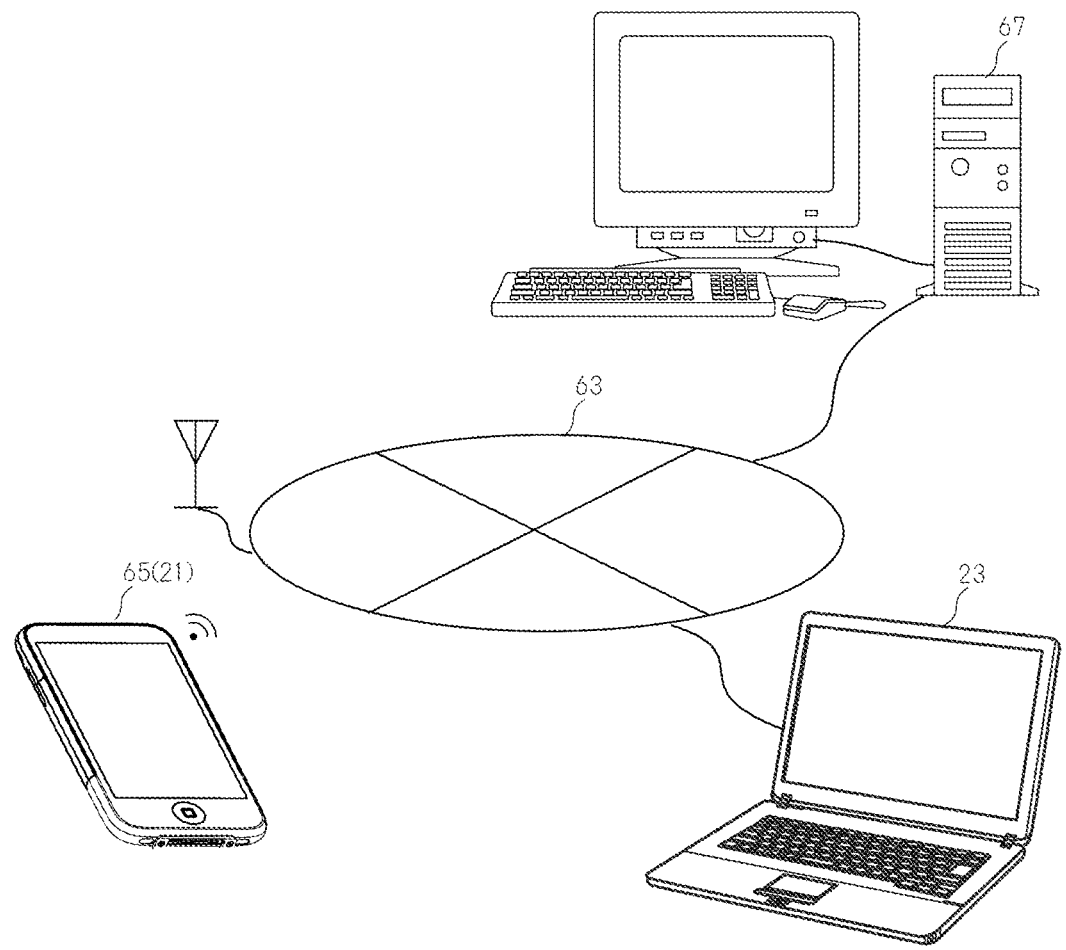

[Fig. 4]
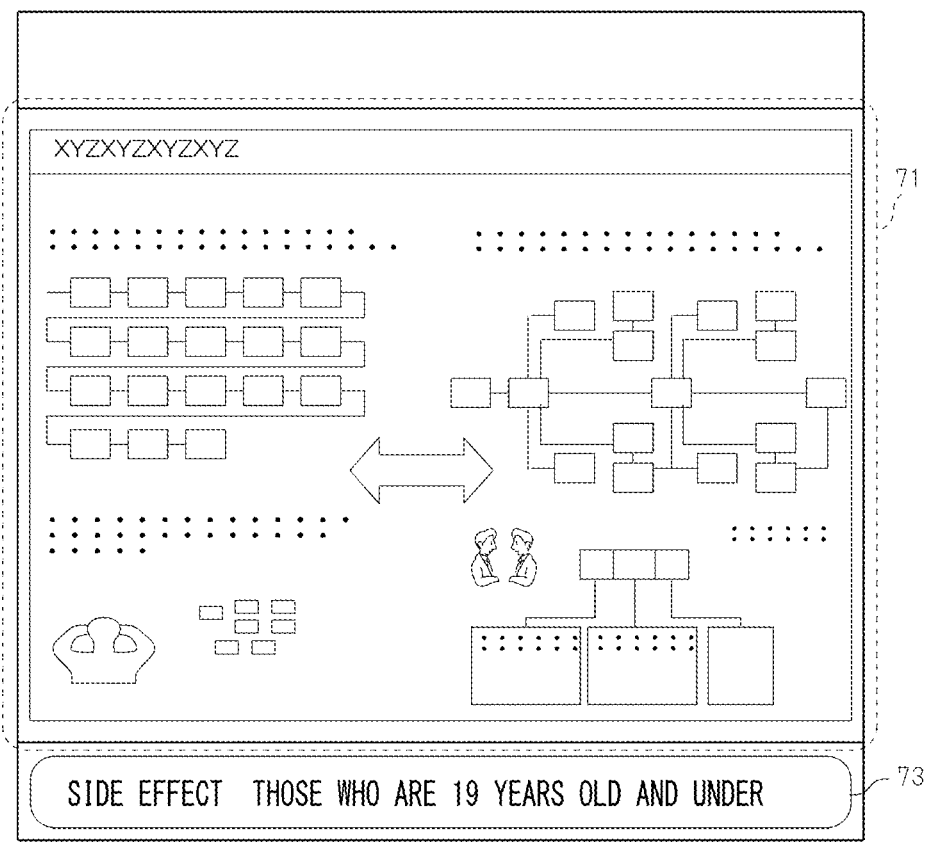

[Fig. 5]
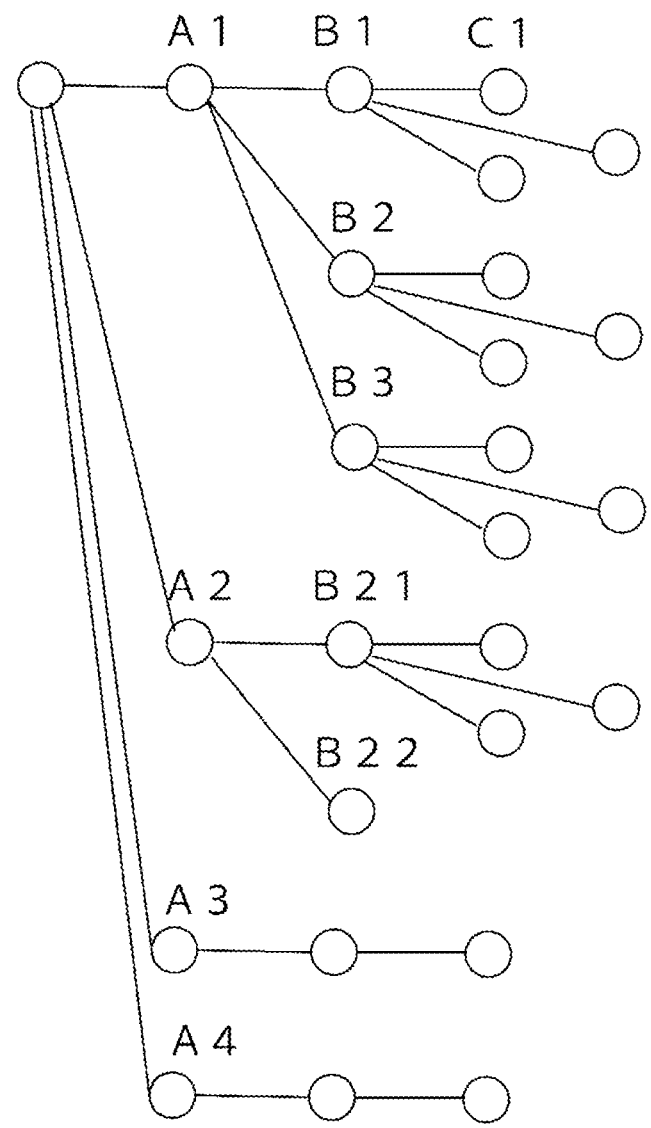

[Fig. 6]
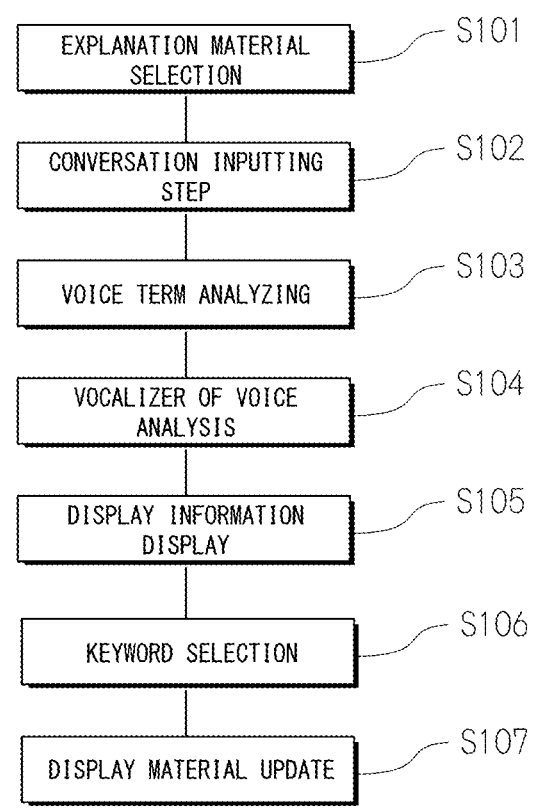

[Fig. 7]
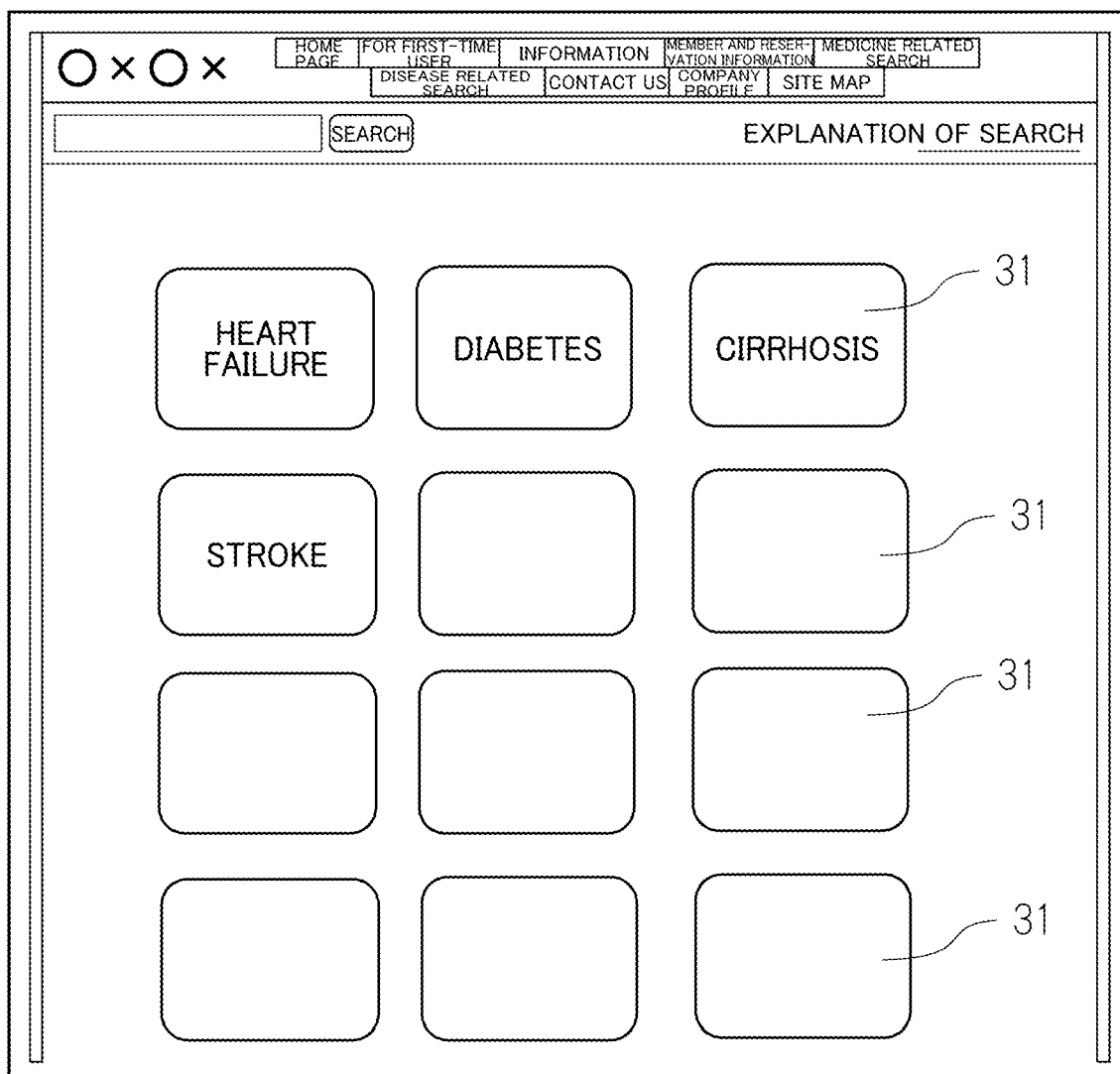

EXPLANATION SUPPORT SYSTEM

TECHNICAL FIELD

This invention relates to an explanation support system. More specifically, the present invention relates to a system for analyzing a vocalizer of voices and making use of information related to the analyzed vocalizer to support explanation dynamically.

BACKGROUND ART

Japanese Patent No. 6758732, Patent Document 1, discloses a presentation support system. This system relates to a presentation support system with which even an ordinary presenter can make an effective presentation. This system allows making an effective presentation by analyzing an appearance order of a plurality of keywords included in a voice and changing an order of the keywords that are displayed on a display unit based on the analyzed appearance order.

Meanwhile, for example, when an MR explains to a doctor or when a teacher explains to students, most of the voice analyzed is a voice derived from the MR or the teacher. In this case, the voice of the MR or the teacher is prioritized to display keywords. However, an effective presentation can be made by respecting a remark of the doctor or the students who have fewer voices in some cases. In addition, when only the voice analysis is performed, terms included in a noise is analyzed and a navigation that a speaker desires is not performed in some cases.

CITATION LIST

Patent Literature

Patent Document 1: Japanese Patent No. 6758732

DISCLOSURE OF THE INVENTION

Problems to be Solved by the Invention

An object of this invention is to provide a system for supporting an explanation so as to be able to make an explanation in consideration of an explanation vocalizer.

Solutions to the Problems

This invention is basically based on a knowledge that, when a conversation including voices derived from a plurality of vocalizers is analyzed to make an explanation, the explanation can be effectively supported by changing a display content in consideration of the vocalizers of the voices.

One invention described in this description relates to an explanation support system 1. This system is a system using a computer.

This system includes a display unit 3, a material storage unit 5, a display information storage unit 7, a voice analysis unit 9, and a display control unit 11. Each unit in this description can be achieved by each means or each element in the computer. The units may be achieved by software or hardware, or may be achieved by a collaboration of software and hardware.

The display unit 3 is a kind of output unit of the computer, and is usually a display unit that a person on the side of making an explanation or a presenter can see.

The material storage unit 5 is an element for storing an explanation material and a plurality of keywords related to the explanation material.

The display information storage unit 7 is an element for storing display information displayed on the display unit 3 based on a combination of the keywords.

The voice analysis unit 9 is an element for analyzing voice terms that are terms included in voice information related to the explanation material and vocalizers of the voice terms.

The display control unit 11 is an element for identifying which of the plurality of keywords the voice term of a specific vocalizer analyzed by the voice analysis unit 9 is, reading out the display information from the display information storage unit 7 using information related to the identified keyword, and causing the display unit 3 to display the display information.

As a preferred example of the above system, the display control unit 11 prioritizes a case where the vocalizer of the voice term is a vocalizer derived from a second terminal 23 that is a terminal other than a first terminal 21 over a case where the vocalizer of the voice term is a vocalizer derived from the first terminal 21 connected to the display unit 3 so as to cause the display unit 3 to display the display information.

As a preferred example of the above system, the display information includes display keywords that are any two or more keywords among the plurality of keywords.

Then, the explanation support system 1 further includes a selection information input unit 25 that inputs selection information of the display keywords. The material storage unit 5 stores the keywords in association with pages of the explanation material. The display control unit 11 displays, based on the selection information of a display keyword input by the selection information input unit 25, a page of the explanation material stored in association with the selection information from the material storage unit 5 on the display unit 3.

As a preferred example of the above system, the explanation support system 1 includes a content display unit 33, a selected content input unit 35, a content related person information storage unit 37, and an available person information storage unit 39. The content display unit 33 is for displaying a plurality of contents 31. The selected content input unit 35 inputs a selected content that is a content selected among the plurality of contents 31. The content related person information storage unit 37 stores content related person information related to a plurality of terminals or a plurality of vocalizers associated with the plurality of contents 31. The available person information storage unit 39 stores available person information about an available terminal or vocalizer in the content related person information stored by the content related person information storage unit 37. The explanation support system 1 further includes a terminal selection unit 41 that selects the first terminal 21 based on the available person information when the second terminal 23 selects the selected content.

As a preferred example of the above system, a user storage unit 43 that stores information related to a user of the second terminal 23 is further included, and the terminal selection unit 41 selects the first terminal 21 using the user information stored by the user storage unit 43 and the available person information.

Advantageous Effects of the Invention

With this invention, since a display content is changed in consideration of a remark of a person who receives an explanation, a system that can support the explanation in consideration of the remark of the person who receives the explanation can be provided. Additionally, with this invention, when a conversation including voices derived from a plurality of vocalizers is analyzed to make an explanation, the explanation can be effectively supported by changing the display content, such as removing a term derived from an external noise, in consideration of the vocalizers of the voices.

BRIEF DESCRIPTION OF THE DRAWINGS

FIG. 1 is a block diagram illustrating an exemplary configuration of an explanation support system.

FIG. 2 is a block diagram illustrating a basic configuration of a computer.

FIG. 3 is a conceptual diagram illustrating an example of the system of the present invention.

FIG. 4 is a conceptual diagram illustrating a display example of a presentation material.

FIG. 5 is a conceptual diagram illustrating keywords in a word order adjusted by a keyword order adjustment unit.

FIG. 6 is a flowchart illustrating an operation example of this system.

FIG. 7 is a conceptual diagram illustrating an example of a website display screen.

DESCRIPTION OF PREFERRED EMBODIMENTS

The following describes embodiments of the present invention using the drawings. The present invention is not limited to the embodiments described below, but includes modifications from the following embodiments appropriately made by those skilled in the art within the obvious scope.

One invention described in this description relates to an explanation support system. This system is a system using a computer.

FIG. 1 is a block diagram illustrating an exemplary configuration of the explanation support system. As illustrated in FIG. 1, this system 1 includes a display unit 3, a material storage unit 5, a display information storage unit 7, a voice analysis unit 9, and a display control unit 11. As illustrated in FIG. 1, this system may further include a selection information input unit 25, a content display unit 33, a selected content input unit 35, a content related person information storage unit 37, an available person information storage unit 39, a terminal selection unit 41, and a user storage unit 43, and may appropriately include various elements included in the computer. However, according to another invention that is different from the above described in this description, a system includes the content display unit 33, the selected content input unit 35, the content related person information storage unit 37, the available person information storage unit 39, the terminal selection unit 41, and the user storage unit 43 but does not include the voice analysis unit 9 or the display control unit 11.

Each unit in this description can be achieved by each means, each element, or each process in the computer. The units may be achieved by software or hardware, or may be achieved by a collaboration of software and hardware. This system may be implemented by the computer or may be implemented by a server client system using the computer and a server. The computer may be any of a mobile terminal, a desktop type personal computer, and a server, or a combination of two or more thereof. These are usually connected so as to be able to transmit and receive information via the Internet (intranet) or the like. A plurality of computers may be used to share functions, for example, by allowing any of the computers to have a part of the functions.

FIG. 2 is a block diagram illustrating a basic configuration of the computer. As illustrated in this drawing, the computer has an input unit 51, an output unit 53, a control unit 55, a calculation unit 57, and a storage unit 59, and each element is connected by, for example, a bus 61 so as to be able to transmit and receive information. For example, in the storage unit, a control program may be stored, or various information may be stored. When predetermined information is input from the input unit, the control unit reads out the control program stored in the storage unit. Then, the control unit reads out the information stored appropriately in the storage unit and transmits it to the calculation unit. Further, the control unit transmits the information input appropriately to the calculation unit. The calculation unit conducts a computation process using the received various information, and stores the resultant in the storage unit. The control unit reads out the result of the computation process stored in the storage unit and outputs it from the output unit. Various processes are thus conducted. The various processes are conducted by each means or each unit.

FIG. 3 is a conceptual diagram illustrating an example of the system of the present invention. As illustrated in FIG. 3, the system of the present invention (the system including a device of the present invention) may be a system including a mobile terminal 65 connected to the Internet or intranet 63 and a server 67 connected to the Internet or intranet 63. Surely, a single computer or mobile terminal may function as the device of the present invention, or a plurality of servers may exist. In the example of this drawing, the mobile terminal 65 is a first terminal 21 and is connected in an aspect so as to be able to exchange information with a second terminal 23 via the Internet.

The display unit 3 is an element for displaying various information based on the computer. A monitor or display that is a kind of the output unit 53 of the computer or a touch panel of a smartphone functions as the display unit 3. The display unit 3 may be a projector. When a presentation is made, a monitor of the computer or a tablet may function as the display unit 3, and a presentation material may be broadcasted via the projector. In this case, as described later, not only the presentation material, but also any of information related to a keyword order or an explanatory text may be displayed, or both of them may be displayed together on the monitor.

The material storage unit 5 is an element for storing an explanation material and a plurality of keywords related to the explanation material. The storage unit of the computer functions as the material storage unit 5. When the explanation material has a plurality of pages, a plurality of keywords may be stored for each page. Each explanation material and each page may be stored together with information, such as a file name and an ID, such that the explanation material and the plurality of keywords are read out using the information. An example of the explanation material is a presentation material. An example of the presentation material is a material created with PowerPoint (registered trademark) or pdf (registered trademark). The presentation material means, for example, a whole (one file) of a sequence of materials created by software, such as PowerPoint (registered trademark) or means a specific page. For example, an identification number or ID is assigned for each presentation material. Then, the material storage unit 5 stores a plurality of keywords in association with assigned information (an identification number or ID) or an identification number and a page number (slide number). Thus, each presentation material or each page (each slide) of each material are stored in association with a plurality of keywords related to each presentation material.

An example of the presentation material is a PowerPoint material related to a new medicine X related to diabetes. Examples of a plurality of keywords related to the presentation material include "diabetes," "X," "dose," "side effect, " "giddiness," "sleepiness," "pregnant women" to whom the drug should not be administered, and "those who are 19 years old and under" to whom the drug that should not be administered, which are the keywords related to the PowerPoint material. These are, for example, stored in the material storage unit 5 in association with the identification number (and each page number) of the presentation material.

FIG. 4 is a conceptual diagram illustrating a display example of a presentation material. In this example, for example, an explanation material display area (presentation area) 71 that displays a certain page of the presentation material created with PowerPoint and a display information display area (keyword display area) 73 that displays display information (such as keywords) exist on the display unit 3. For example, a display image of the presentation area 71 is displayed on a projector and a monitor on an opposite party side (a display unit on the opposite party side). Examples of the display unit on the opposite party side include a monitor on the opposite party side, a display for a plurality of students, and a display for a plurality of audiences. That is, in this example, the display unit has an area where a certain part (certain page) of the explanation material is displayed and a display area that displays the display information associated with the explanation material or the certain part of the explanation material. On the display area, for example, keywords associated with the explanation material or the certain part of the explanation material are appropriately displayed. As described above, this display example is updated in real time based on a conversation between a speaker and an audience. The display unit is preferably in a touch panel form configured to input a term to the system by touching the display information displayed on the display area and selecting the term that exists in the touched area.

The display information storage unit 7 is an element for storing the display information displayed on the display unit 3 based on a combination of keywords. For the combination of keywords, it is preferred that a plurality of combinations of keywords are stored in association with the explanation material and the pages of the explanation material described above. For example, a combination of keywords related to one page is "diabetes" and "pregnant women," and an example of the display information displayed on the display unit is "side effect" and "those who are 19 years old and under." For example, when a person who receives the explanation makes a remark of the combination of "diabetes" and "pregnant women," "side effect" and "those who are 19 years old and under" are displayed on the display unit of the person who makes the explanation. Then, the person who makes the explanation does not forget to make the explanation related to "side effect" and "those who are 19 years old and under." The combination of keywords includes a keyword appearance order. For example, it may be configured to display the keywords "side effect" and "those who are 19 years old and under" on the display unit when the keyword "pregnant women" appears after the keyword "diabetes."

FIG. 5 is conceptual diagram illustrating an example of the combinations of keywords based on a keyword appearance order. For example, when a term of A1 is used next to a certain term, B1, B2, and B3 may be displayed as the display information, or B1 and C1 may be displayed as the best candidates.

The voice analysis unit 9 is an element for analyzing voice terms that are terms included in voice information related to an explanation material and a vocalizer of the voice terms.

The voice information related to an explanation material is voice information in which a sound related to the explanation material that a human or machine makes is recorded. The voice information may be any of an explanation, a presentation, a conversation, a chat, and a question answering. For example, a storage unit stores a presentation including voice information related to a presentation material. Examples of the presentation include a voice and a video when a presenter made an explanation based on a presentation material. The presentation may be voice information that is converted into electrical information via a sound pickup device (input unit of a computer), such as a microphone, and input to the computer. In addition, the presentation may be a video and voice information that are converted into electrical information via a recording device, such as a video device, and input to the computer. Thus, the voice information (and the video) input from the input unit of the computer is stored in the storage unit. However, in this invention, it is preferred that not only the voice of the presenter (speaker) but also the voice of the audience (opposite party) is recorded. Specifically, it is preferred that not only the voice of a person who makes an explanation, such as an MR, but also the voice of a person who receives the explanation, such as a doctor, are recorded in the storage unit.

The voice analysis unit 9 is an element for analyzing terms included in the voice information related to an explanation material. The voice analysis unit 9 is, for example, implemented by a control program stored in the storage unit. A voice recognition device is publicly known. Therefore, a voice analysis unit of a publicly known voice recognition device can be appropriately used. For example, the voice information of a presentation stored in a recording unit is read out. Then, the control unit of the computer reads out the control program stored in the storage unit and causes the calculation unit to analyze the read voice information. At this time, it is only necessary to read out a plurality of terms and the voice information of the terms stored in the storage unit and analyze the term included in the presentation. Then, it is only necessary to cause the storage unit appropriately to store the analyzed term. Thus, the voice analysis unit 9 can analyze the term included in the presentation stored by a voice storage unit.

The voice analysis unit 9 analyzes the vocalizers of voice terms based on the voice information. An example of analyzing the vocalizers of the voice terms is to analyze whether the vocalizer of a speech of the voice information is alone or a plurality of persons. Furthermore, an example of analyzing the vocalizers of the voice terms is to discriminate a presenter (speaker) from others (an audience and a questioner). For example, a voiceprint of a presenter may be stored in the storage unit, and the voice analysis unit 9 may read out the voiceprint of the presenter from the storage unit to analyze whether the vocalizer of a voice term is the presenter or the others. The voice analysis unit 9 may analyze a frequency of the voice information to determine the vocalizers of the voice terms. Furthermore, based on to which terminal the voice information is input, the vocalizers of the voice terms may be determined. Accordingly, the voice analysis unit 9 can analyze the vocalizers of the voice terms.

Specific examples of the vocalizer include combinations of a speaker and an audience, such as a presenter and an audience, an MR and a doctor, a doctor and a patient, a bank clerk and a customer, an employee and a customer, and a shop assistant and a customer.

The storage unit may analyze and store in the storage unit a term included in a presentation together with information related to a person who makes a presentation and information related to an opposite party to whom the presentation is given. The information on the person who makes a presentation may be stored in the storage unit. Examples of the information on the person who makes a presentation include employee number, name, gender, age, business result, post, birthplace, presentation evaluation, length of service, and years in charge. Examples of the information related to the opposite party to whom the presentation is given include scale of a hospital, region of the hospital, whether the presentation is a lecture or for one doctor, and information related to the doctor (if the presentation is for the doctor). Other examples of the information related to the opposite party to whom the presentation is given include place of a course, level of those taking the course, grade of those taking the course, count of those taking the course, occupation of those taking the course, work contents of those taking the course, length of service of those taking the course, and post of those taking the course.

The display control unit 11 is an element for identifying which of the plurality of keywords the voice term of a specific vocalizer analyzed by the voice analysis unit 9 is, reading out the display information from the display information storage unit 7 using information related to the identified keyword, and causing the display unit 3 to display the display information.

The voice term of a specific vocalizer is, for example, a voice term of a speaker (presenter) or a voice term of those other than the speaker. As described above, the voice analysis unit 9 analyzes the voice terms as well as analyzes the vocalizer of each voice term, and stores them in the storage unit. Then, the display control unit 11 cross-checks the voice term of the speaker (or the audience) with a plurality of keywords related to an explanation material. When a keyword obtained by cross-checking (an identified keyword) is stored in the storage unit and it corresponds to a combination of keywords, the display information is read out based on the combination of keywords and displayed on the display unit 3.

The display control unit 11 preferably prioritizes a case where the vocalizer of the voice term is a vocalizer derived from the second terminal 23 that is a terminal other than the first terminal 21 over a case where the vocalizer of the voice term is a vocalizer derived from the first terminal 21 connected to the display unit 3 so as to cause the display unit 3 to display the display information. For example, when an MR makes an explanation to a doctor, display information for assisting the explanation of the MR is displayed on a terminal of the MR while the MR continues speaking. When the doctor asks a question in mid-course, display information for accurately answering to the doctor's question is displayed on the terminal of the MR.

As a preferred example of the above system, the display information includes display keywords that are any two or more keywords among the plurality of keywords.

Then, the explanation support system 1 further includes a selection information input unit 25 that inputs selection information of the display keywords. The material storage unit 5 stores the keywords in association with pages of the explanation material. The display control unit 11 displays, based on the selection information of a display keyword input by the selection information input unit 25, a page of the explanation material stored in association with the selection information from the material storage unit 5 on the display unit 3.

An example of the selection information input unit 25 is a unit that has a display unit in a touch panel form. Thus, the display keywords are displayed on the display unit, and the selection information input unit 25 is configured to input the information on selection of a display keyword to the system by touching the display keyword that is displayed. For example, display of "side effect" and "those who are 19 years old and under" is displayed on the display unit. The MR touches the area where "side effect" is displayed on the touch panel. Then, a page of the explanation material that is stored in association with "side effect" of the explanation material is read out from the storage unit and displayed on the display unit. This display may be displayed not only on the display unit but also on a terminal display unit (second display unit) of the second terminal 23.

This system may be a system that causes a computer (or processor) to store an explanation material and a plurality of keywords related to the explanation material, store display information displayed based on a combination of keywords, analyze voice terms that are terms included in voice information related to the explanation material and vocalizers of the voice terms, identify which of the plurality of keywords the voice term of a specific vocalizer analyzed is, read out the display information using information related to the identified keyword, and display the display information.

This system can achieve the above-described various aspects.

This description also provides a method of causing a computer (or processor) to store an explanation material and a plurality of keywords related to the explanation material, store display information displayed based on a combination of keywords, analyze voice terms that are terms included in voice information related to the explanation material and vocalizers of the voice terms, identify which of the plurality of keywords the voice term of a specific vocalizer analyzed is, read out the display information using information related to the identified keyword, and display the display information.

This description also describes a program for causing a computer (or processor) to function as each unit described above and an information recording medium that stores the program.

A specific example of the program is a program for causing a computer to function as the explanation support system 1 that includes the display unit 3, the material storage unit 5 that stores an explanation material and a plurality of keywords related to the explanation material, the display information storage unit 7 that stores display information displayed on the display unit 3 based on a combination of keywords, the voice analysis unit 9 that analyzes voice terms that are terms included in voice information related to the explanation material and vocalizers of the voice terms, and the display control unit 11 that identifies which of the plurality of keywords the voice term of a specific vocalizer analyzed by the voice analysis unit 9 is, reads out the display information from the display information storage unit 7 using information related to the identified keyword, and causes the display unit 3 to display the display information.

FIG. 6 is a flowchart illustrating an operation example of this system.

This system causes a storage unit to store an explanation material and a plurality of keywords related to the explanation material. In addition, this system causes the storage unit to store display information displayed based on a combination of keywords. This system preferably stores each keyword in association with a page of the explanation material. This example is an example in which an MR makes an explanation to a doctor using a presentation material (explanation material). In this example, a terminal for the MR (first terminal) and a terminal for the doctor (second terminal) are used. However, when the MR and the doctor are in close proximity to one another, one terminal may be shared.

Explanation Material Selecting Step (S101)

The MR selects a presentation material related to a certain drug. Then, information indicating that a specific explanation material has been selected is input to the system. The system reads out the explanation material stored in the storage unit and causes a display unit of the terminal for the MR to display the explanation material. The example is as illustrated in FIG. 4. Meanwhile, the system reads out a plurality of keywords related to the explanation material stored in the storage unit. Even in this state, related to the explanation material, a keyword that is preferably used first (initial display keyword) may be displayed on the display unit. Then, the MR can make the explanation to the doctor by reference to the keyword displayed on the display unit. This step may be performed anew every time a part of the explanation material (page of the presentation material) is changed.

Conversation Inputting Step (S102)

When the MR makes the explanation, a conversation of the MR is input via an input unit (such as a microphone) of the terminal for the MR. Then, the conversation is converted into digital voice information, which is stored in the storage unit. When the doctor makes a remark, such as a question, the doctor's question is input via, for example, an input unit of the terminal for the doctor. Then, the question is converted into digital voice information, which is stored in the storage unit. Thus, the voice information by the conversation is input to the system.

Voice Term Analyzing Step (S103)

The voice information is stored in the storage unit. Then, the system reads out the stored voice information to perform a term analysis of the voice information. At this time, it is only necessary to obtain the voice terms included in the conversation by using a publicly known dictionary and comparing with the voice information and store them appropriately in the storage unit.

Vocalizer of Voice Analyzing Step (S104)

Next, the system analyzes vocalizers of the voice terms. This step may be omitted to continue displaying the display information without analyzing the vocalizers of the voice terms. On that basis, when this system is used, the vocalizers of the voice terms may be analyzed as a vocalizer analysis mode, and the display information may be updated based on the analyzed vocalizers.

Display Information Displaying Step (S105)

For example, in a normal mode (when a vocalizer is not identified), which of the keywords stored in the storage unit is identified to be the voice term stored in the storage unit, and it is stored in the storage unit. This operation is repeated, and when one or a plurality of keywords correspond to a specific combination of keywords stored in the storage unit, the display information stored in the storage unit in association with the combination is read out from the storage unit and displayed on the display unit.

In addition, in an audience mode (when a remark of the audience is prioritized over the speaker), when a remark is made from the audience, which of the plurality of keywords is identified to be the voice term derived from the audience, and using the information related to the identified keywords, the display information is read out and displayed on the display unit. Note that, in a speaker mode (mode in which a remark from the audience is discounted), even when a noise from the audience is input to the system, the display information is displayed on the display unit based on a remark of the speaker.

As described above, for example, "side effect" and "those who are 19 years old and under" are displayed on the display unit of the terminal for the MR. At this stage, the display appropriate for the presentation is made, which means that the explanation is supported.

Keyword Selecting Step (S106)

The MR touches any of "side effect" and "those who are 19 years old and under" that are the keywords (display keywords) displayed on the display unit. For example, the MR touches an area of the side effect. Then, by the touch panel input, the information related to selecting "side effect" is input to the terminal. Note that icons (keyword icons) related to "side effect" and "those who are 19 years old and under" may be displayed on a display screen and a keyword may be selected by specifying an icon and clicking this icon. In addition, a keyword may be selected by another publicly known method.

Display Material Updating Step (S107)

In the above step, the side effect that is a display keyword is selected. Then, the system reads out the information related to a page of the explanation material stored in association with the side effect, and on that basis, the page of the explanation material is read out from the storage unit. Then, the system displays the read page of the explanation material on the display unit of the terminal for the MR. In parallel with it, the read page of the explanation material is displayed also on the display unit of the terminal for the doctor. Then, the MR can make the explanation smoothly about the page of the explanation material read out in association with the side effect.

System for Guiding Appropriate Terminal

Next, a system for guiding an appropriate terminal will be described. This system can be used as a part of the above system or can be used as a different system from the above system.

This system includes the content display unit 33, the selected content input unit 35, the content related person information storage unit 37, the available person information storage unit 39, and the terminal selection unit 41. This system may further include the user storage unit 43.

The content display unit 33 is an element for displaying a plurality of contents 31.

The selected content input unit 35 is an element for inputting a selected content that is a content selected among the plurality of contents 31.

The content related person information storage unit 37 is an element for storing content related person information related to a plurality of terminals or a plurality of vocalizers associated with the plurality of contents 31.

The available person information storage unit 39 is an element for storing available person information about an available terminal or vocalizer in the content related person information stored by the content related person information storage unit 37.

The terminal selection unit 41 is an element for selecting the first terminal 21 based on the available person information when the second terminal 23 selects the selected content.

The user storage unit 43 is an element for storing information related to a user of the second terminal 23. In this case, the terminal selection unit 41 preferably selects the first terminal 21 using the user information stored by the user storage unit 43 and the available person information.

FIG. 7 is a conceptual diagram illustrating an example of a website display screen displayed on the display unit of the second terminal. As illustrated in FIG. 7, the plurality of contents 31 are displayed on this display screen. Examples of the plurality of contents include disease name, medicine name, and product name. For example, a plurality of disease names are displayed on a certain website display screen. This system conducts a process such that the plurality of contents 31 described above are displayed on the terminal of a user who accesses this website. Therefore, this system stores information related to the plurality of disease names described above in a storage unit and causes the storage unit to store information for causing a display unit of the user to display the website.

A doctor moves a cursor using a pointing device, such as a computer mouse, and clicks any of the plurality of contents displayed on the website. Then, to the system, information indicating that the selected content that is a content selected among the plurality of contents 31 have been input is input. For example, when the diabetes is selected among a plurality of diseases, the information indicating that the diabetes has been selected is input to the system.

The system stores information related to a plurality of terminals or a plurality of vocalizers associated with each of the contents. For example, in association with a content about the diabetes, identification information of a person who can respond to questions about the diabetes, personal information for reading out the person, and terminal information of the person are stored in the storage unit. For example, on this website, when persons who can make an explanation related to the diabetes are person A1, person A2, person A3, and person A4, information, such as names and terminal IDs of the persons associated with these diabetes content, is stored.

In addition, the system stores the available person information about an available terminal or vocalizer in the content related person information stored by the content related person information storage unit 37. For example, the system stores attendance information of person A1, person A2, person A3, and person A4. Among these persons, persons who have come to work may be stored as available vocalizers and terminals operated by the vocalizers may be stored as available terminals in the storage unit. In addition, the system may analyze and temporarily store terminals (for example, terminals of person A1 and person A2), among the terminals of person A1, person A2, person A3, and person A4, which are logged in (connected to the Internet) and not in a busy state (working state) but in a wait state (available state).

Subsequently, the system selects the first terminal 21 based on the available person information when the second terminal 23 selects the selected content. For example, when the terminal of a doctor selects the diabetes, a terminal of an available person is selected based on the available person information related to the diabetes. In this case, for example, since the terminals of person A1 and person A2 are available terminals, the system selects, for example, the terminal of person A1 (first terminal 21). Then, an explanation (web conference) starts between the terminal of the doctor (second terminal 23) and the terminal of the MR (first terminal 21). At this time, the explanation support system described above is used.

The storage unit of the system may store information (such as ID) related to a user of a terminal that accesses this site. In this case, the terminal selection unit 41 may select the first terminal 21 using the user information stored by the user storage unit 43 and the available person information. For example, a record on past exchange of this user with person A1 and a point that an evaluation point at the time of the exchange was abnormal based on the threshold are stored as the information related to the user. Then, as described above, it is only necessary that this system determines the terminals of person A1 and person A2 as the available terminals, and afterwards, selects the terminal of person A1 (first terminal 21) using the above information on the exchange with person A1 and the evaluation that is the information related to the user. Accordingly, a person in charge to fit preferences of the user can be put in charge. This system may be used when the case of being the vocalizer derived from the second terminal 23 is prioritized to cause the display unit 3 to display the display information, or when the case of being the vocalizer derived from the first terminal is prioritized to display the display information on the display unit. Surely, this system can also be used when the above display information is not displayed on the display unit.

This description also provides a program for causing a computer to function as the explanation support system 1 and an information recording medium that stores the program. The explanation support system 1 includes the content display unit 33 for displaying a plurality of contents 31, the selected content input unit 35 that inputs a selected content that is a content selected among the plurality of contents 31, the content related person information storage unit 37 that stores the content related person information related to a plurality of terminals or a plurality of vocalizers associated with the plurality of contents 31, and the available person information storage unit 39 that stores the available person information about an available terminal or vocalizer in the content related person information stored by the content related person information storage unit 37, and the explanation support system 1 further includes the terminal selection unit 41 that selects the first terminal 21 based on the available person information when the second terminal 23 selects the selected content.

This description also provides the explanation support system 1 that causes a computer or processor to display a plurality of contents 31, input a selected content that is a content selected among the plurality of contents 31, store the content related person information related to a plurality of terminals or a plurality of vocalizers associated with the plurality of contents 31, store the available person information about an available terminal or vocalizer in the content related person information, and select the first terminal 21 based on the available person information when the second terminal 23 selects the selected content.

INDUSTRIAL APPLICABILITY

This invention can be used in the information-related industry.

DESCRIPTION OF REFERENCE SIGNS

1 . . . explanation support system
3 . . . display unit
5 . . . material storage unit
7 . . . display information storage unit
9 . . . voice analysis unit
11 . . . display control unit

The invention claimed is:

1. An explanation support system comprising:
a display unit;
a material storage unit that stores an explanation material and a plurality of keywords related to the explanation material;
a display information storage unit that stores display information displayed on the display unit based on a combination of the keywords;
a voice analysis unit that analyzes a voice term that is a term included in voice information related to the explanation material and analyzes a voiceprint of a vocalizer to determine that the vocalizer of the voice term is a vocalizer derived from a second terminal that is a terminal other than a first terminal based on the voiceprint;
a display control unit that identifies which of the plurality of keywords a voice term of a specific vocalizer analyzed by the voice analysis unit is, reads out the display information from the display information storage unit using information related to both the identified keyword and vocalizer attribute information, and causes the display unit to display the display information, wherein
the display information includes display keywords that are any two or more keywords among the plurality of keywords,
the explanation support system further comprises a selection information input unit that inputs selection information of the display keywords, wherein
the material storage unit stores the keywords in association with a page of the explanation material,
the display control unit displays, based on the selection information of the display keyword input by the selection information input unit, a page of the explanation material stored in association with the selection information from the material storage unit on the display unit,
and
the display control unit controls display content based on a combination of
(i) a relationship between a first entity derived from the first terminal and a second entity derived from the second terminal, and
(ii) keywords contained in the voice term,
wherein the display control unit determines the relationship by analyzing role-based attributes of both entities and selects display information that is optimized for the relationship between vocalizers.

2. The explanation support system according to claim 1, comprising:
a content display unit for displaying a plurality of contents;
a selected content input unit that inputs a selected content that is a content selected among the plurality of contents;
a content related person information storage unit that stores content related person information related to a plurality of terminals or a plurality of vocalizers associated with the plurality of contents; and
an available person information storage unit that stores available person information about an available terminal or vocalizer in the content related person information stored by the content related person information storage unit, wherein a terminal selection unit that selects the first terminal based on the available person information when the second terminal selects the selected content.

3. The explanation support system according to claim 2, further comprising
a user storage unit that stores information related to a user of the second terminal, wherein
the terminal selection unit selects the first terminal using the user information stored by the user storage unit, and the available person information.

4. A computer-implemented method for supporting a computer implemented explanation, comprising executing on a processor the steps of:
storing an explanation material and a plurality of keywords related to the explanation material;
storing display information displayed on a display based on a combination of the keywords;
analyzing a voice term that is a term included in voice information related to the explanation material and analyzing a voiceprint of a vocalizer to determine that the vocalizer of the voice term is a vocalizer derived from a second terminal that is a terminal other than a first terminal based on the voiceprint;
identifying which of the plurality of keywords a voice term of a specific vocalizer analyzed is, and
reading out the display information using information related to both the identified keyword and vocalizer attribute information, and causing the display to display the display information, wherein
the display information includes display keywords that are any two or more keywords among the plurality of keywords,
the computer-implemented method further comprises the steps of:
inputting selection information of the display keywords,
storing the keywords in association with a page of the explanation material,
displaying, based on the selection information of the display keyword input, a page of the explanation material stored in association with the selection information on the display, and
controlling display content based on a combination of
(i) a relationship between a first entity derived from the first terminal and a second entity derived from the second terminal, and (ii) keywords contained in the voice term, wherein the controlling step includes determining the relationship by analyzing role-based attributes of both entities and selecting display information that is optimized for the relationship between vocalizers.

\* \* \* \* \*